3,069,378
COVULCANIZATE OF FLUORINATED POLYAC-
RYLATE ELASTOMER AND ORGANOPOLYSI-
LOXANE GUM
Maurice Prober, Schenectady, N.Y., assignor to General
Electric Company, a corporation of New York
No Drawing. Filed Aug. 16, 1957, Ser. No. 678,544
12 Claims. (Cl. 260—41)

This invention relates to blends of organopolysiloxanes with fluorinated elastomers, to the convulcanizates prepared from these blends, and to the methods by which these products are prepared. More particularly, the present invention relates to blends of organopolysiloxane gums convertible to the cured, solid, elastic state and fluorinated acrylate esters.

For industrial uses it is desirable to have a gum which can be converted to a rubber which is resistant to oxidation, which is resistant to thermal decomposition, which has a high tensile strength, which is flexible at low temperatures, and which exhibits low swelling in conventional non-polar solvents, such as hydrocarbon solvents, conventional fuels, conventional lubricating oils and polar solvents such as acetone. A material having these properties would be particularly valuable in aircraft applications, for example, as gasketing material, where extremes of temperature are encountered and where the material is in contact with aircraft fuels or lubricants. However, a material having a combination of all of these properties is not known in the art.

One group of materials which contains a large number of desirable properties of this nature are the fluorinated acrylate ester elastomers, such as poly-1,1-dihydroperfluorobutyl acrylate which is commercially available as 3M Brand Fluoro-Rubber 1F4. This product has a good tensile strength and is resistant to non-polar solvents. However, it is not satisfactory for many applications because of oxidative degradation at elevated temperatures, because of poor flexibility at low temperatures, and because of poor resistance to polar solvents. Another material possessing a number of good properties is silicone rubber, particularly those silicone rubbers formed from dimethylsiloxane units. These silicone rubbers are very resistant to oxidation, have excellent resistance to thermal decomposition, have a good tensile strength, are very flexible at low temperatures, and are resistant to polar solvents. However, these silicone rubbers are generally deficient in resistance to non-polar solvents, exhibiting a very large percentage of swell when in contact with aliphatic and aromatic solvents.

I have now discovered a copolymer or covulcanizate of a fluorinated gum and a silicone gum which meets all of the property requirements described above for application as gasket material in aircraft. In particular, my invention relates to a blend of a fluorinated polyacrylate ester gum consisting essentially of the recurring unit (1)   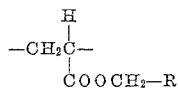

where R is a member selected from the class consisting of perfluoroalkyl radicals, perfluoroalkoxyperfluoroalkyl radicals, and ω-hydroperfluoroalkoxyperfluoroalkyl radicals and an organopolysiloxane gum having the average structural formula (2)   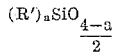

where R' represents members selected from the class consisting of monovalent hydrocarbon radicals and monovalent halogenated hydrocarbon radicals and $a$ has a value of from 1.98 to 2.01, inclusive, preferably at least 40 mol percent of said radicals being methyl radicals. This invention also relates to the covulcanized elastomer prepared from the above blend as well as to the method of preparing both the blend and the covulcanizate.

The monomeric esters from which the gums of Formula 1 are formed are well known in the art and are generally prepared by the reaction of acrylyl chloride with the corresponding fluorinated alcohol. As described in the Journal of Polymer Science, 15, pp. 515–574 (1955), these monomeric materials have the formula (3)   $CH_2=CH—COOCH_2R$ where R is as defined above. The R radical in Formula 3 includes, for example, perfluoromethyl, perfluoroethyl, perfluoropropyl, perfluorobutyl, perfluorooctyl, perfluorodecyl, perfluoromethoxyperfluoromethyl, perfluoroethoxyperfluoromethyl, perfluoroethoxyperfluoroethyl, ω-hydroperfluoromethoxyperfluoromethyl, ω-hydroperfluoroethoxyperfluoroethyl, etc. Among the specific monomeric materials within the scope of Formula 3 may be mentioned, for example, 1,1-dihydroperfluorobutyl acrylate, 1,1-dihydroperfluoroethyl acrylate, 3-perfluoromethoxy-1,1-dihydroperfluoropropyl acrylate, 3(ω-hydroperfluoroethoxy)1,1-dihydroperfluoropropyl acrylate, etc. The monomeric materials of Formula 3 are converted to the polymers of equation (1) by the method described by F. A. Bovey, J. F. Abere, G. B. Rathmann and C. L. Sandberg, J. Polymer Science, 15, 520 (1955). This method comprises heating a mixture of about 100 parts by weight of the monomer with about 180 parts of water and 0.5 part of $K_2S_2O_8$ and 3.0 parts of sodium lauryl sulfate. This heating is generally accomplished at a temperature of about 50° C. This polymerization results in a generally linear, solid gum having the recurring structural units of Formula 1. It is this gum which is vulcanized with a silicone gum to form the blend of the present invention.

The silicone gums or organopolysiloxane gums employed in the practice of the present invention are well known in the art and generally comprise the linear polysiloxanes formed of a number of diorganosiloxane units having the formula (4)   $(R')_2SiO$ together with a sufficient number of intercondensed monoorganosiloxane units having the formula (5)   $(R')SiO_{3/2}$ and triorganosiloxane units (6)   $(R')_3SiO_{1/2}$ so as to form an organopolysiloxane gum within the scope of Formula 2, where R' in Formulae 4, 5 and 6 is as defined above. These R' radicals include alkyl radicals, e.g., methyl, ethyl, butyl, octyl, etc. radicals; aryl radicals, e.g., phenyl, diphenyl, naphthyl, tolyl, xylyl, ethylphenyl, etc. radicals; aralkyl radicals, e.g., benzyl, phenylethyl, etc. radicals; olefinically unsaturated aliphatic hydrocarbon radicals, e.g., vinyl, allyl, etc. radicals; cycloaliphatic radicals, e.g., cyclohexyl, cycloheptyl, cyclohexenyl, etc. radicals; and chlorinated hydrocarbon radicals, e.g., chloromethyl, chlorophenyl, dibromophenyl, chlorobenzyl, etc. radicals. In the preferred embodiment of my invention, the organopolysiloxane of Formula 2 is a dimethyl siloxane gum. Gums of this type are well known in the art and may be prepared, for example, by the rearrangement and condensation of octamethylcyclotetrasiloxane by means of an alkaline catalyst such as potassium hydroxide. Generally this reaction is carried out by mixing anhydrous potassium hydroxide with octamethylcyclotetrasiloxane and heating the resulting mixture to a temperature of about 150° for about 4 hours.

At the end of this time a high molecular weight gum having a viscosity in excess of one million centipoises is obtained.

The blend of the present invention is prepared in any conventional manner by mixing the fluorinated acrylate ester within the scope of Formula 1 with the silicone gum of Formula 2. The most convenient method of carrying out this blending operation is by means of conventional rubber milling rolls where a uniform mixture of the two gums can be obtained. The proportions of the respective gums may vary within extremely wide limits, satisfactory blends being formed from 10 to 90 percent by weight of fluorinated acrylate ester gum and 90 to 10 percent by weight of silicone gum, based on the total weight of the blended gums. Preferably, the blend contains from 25 to 75 percent by weight of the fluorinated acrylate ester gum with the remainder comprising silicone gum.

A covulcanizate may be formed from the blends of the present invention by a number of different methods. One method of effecting vulcanization of the blends of the present invention is by the use of conventional free radical catalysts. For example, during the milling of the fluorinated acrylate ester gum and the silicone gum, the desired catalyst is added to the mixture and thereby uniformly dispersed in the blend. The blend containing the catalyst is then heated at a temperature above the decomposition temperature of the peroxide to effect the vulcanization. Among the catalysts which can be employed to effect the covulcanization are included, peroxides such as benzoyl peroxide, dicumyl peroxide, 2,4-dichlorobenzoyl peroxide, tertiary butyl perbenzoate, etc. and other free radical catalysts, such as $\alpha,\alpha'$azodiisobutyronitrile. The temperature required for the curing is generally about 110–170° C. and the time required is approximately 5 to 30 minutes. The amount of catalyst is not critical, saisfactory results being obtained with from 0.5 to 5 percent, by weight, of catalyst based on the total weight of the two gums in the blend.

Another method of covulcanizing the blend of the present invention is by the use of ionizing radiation. For example, the blend may be subjected to the action of high energy electrons produced by a high voltage electron accelerating apparatus of the type disclosed in Patent 2,144,518, Westendorp, and described in "Electronics," vol. 17, pp. 128–133 (December 1954). In carrying out the irradiation of the blend of the present invention with the aforementioned Westendorp patent, the same procedure may be employed as is described in Patent 2,763,609, Lewis et al., in connection with the vulcanization of pure silicone rubber with high energy electrons.

The most commonly employed units for measuring high energy irradiation are Roentgen units (r. units) defined as the amount of radiation that produces one electrostatic unit of charge per milliliter of dry air under standard conditions.

It will be readily realized that other forms of electron accelerating apparatus may be employed instead of the high voltage apparatus described in the aforementioned Westendorp patent. For example, linear accelerators of the type described by J. C. Slater in the "Reviews of Modern Physics," vol. 20, No. 3, pp. 473–518 (July 1948), may be utilized. In general, the energy of the irradiation preferably employed in the practice of my invention may range from about 50,000 to 20,000,000 electron volts or higher depending upon the thickness. The preferable range is from 100,000 to 10,000,000 electron volts. Although the high energy electron irradiation is preferred since it produced a large amount of easily controllable high energy irradiation within a short time without rendering the product radioactive many other sources of high energy irradiation can also be employed. Examples of such radiation sources are gamma rays, such as can be obtained from $Co^{60}$, spent fuel elements, fission by-products, such as waste solutions, separated isotopes, such as $C_s^{137}$, gaseous fission products liberated from atomic reactions, etc.; other electron sources, such as the betatron, etc.; fast or slow neutrons or the mixed neutron and gamma radiation such as is present in certain atomic reactors, X-rays; and other miscellaneous sources, such as protons, deuterons, alpha-particles fission fragments, such as are available from cyclotrons, etc.

The suitable radiation dose employed in carrying out my invention will, of course, depend on the properties desired in the radiated product and the particular polymer employed. For example, doses of above $1 \times 10^6$r., for example, from about $1 \times 10^6$ to $1 \times 10^8$r. but preferably from $1 \times 10^6$ to $50 \times 10^6$r. can be employed.

When employing high energy electrons for the vulcanization of the blend of the present invention, it is desirable to first form the blend into the desired shape, for example, in the form of a sheet or of an O-ring, and subject this formed shape to the electron irradiation by placing the blend as close as possible to the source of electrons. To decrease wasteful energy absorption between the point of exit of electrons from the electron generating apparatus and the blend, a vacuum chamber having thin entrance and exit windows may be inserted in this space.

In addition to forming convulcanizates of blends containing the polymerized fluorinated acrylate ester of Formula 1 and the silicone gum of Formula 2, it should be understood that various fillers may be employed with the blend prior to vulcanization. When such fillers are employed, it is convenient to mix the filler with the blend while the blend is being formed on conventional milling rolls. These fillers serve as both extenders and reinforcing agents for the covulcanizates of the present invention. Fillers employed in the present invention are characterized by an extremely high surface area per unit volume, as a general rule these fillers have surface areas much greater than one square meter per gram, for example, about 40 to 300 square meters per gram. Among the suitable fillers may be mentioned, for example, silica xerogels, silica aerogels, fume silicas, hydrophobic silicas, metal silicates, such as sodium silicate, etc., titanium dioxide, zinc oxide, metal carbonates, such as calcium carbonate, magnesium carbonate, etc., boron compounds such as boron oxides and boron carbides, carbon blacks, etc. The preferred class of fillers of the present invention are the silica aerogels. One such example of a silica aerogel is Santocel-CS which has a specific surface area of about 160 square meters per gram.

The amount of filler employed in the convulcanizates of the present invention may vary within very wide limits, for example, from about 1 to 60 percent by weight of the filler based on the weight of the covulcanizate. Preferably, I employ from about 20 to 50 percent by weight of filler based on the weight of the covulcanizate. When the blend of the present invention contains a filler, the resulting covulcanizable mixture may be vulcanized in the same method as blends without fillers. Thus, these filler-containing mixtures may be vulcanized by heat alone, by peroxides or by ionizing radiation.

In the following examples, which are illustrative only and not for purposes of limitation, there is described the preparation of a number of blends and covulcanizates of the present invention, together with a comparison of the materials of the present invention with prior art materials. The silicone gum employed in the examples was a polydimethylsiloxane having a viscosity of about 10,000,000 centistokes which had been prepared by heating octamethylcyclotetrasiloxane in the presence of anhydrous potassium hydroxide at a temperature of about 150° C. for four hours. Uniformity of the blends described in the examples was insured by mixing the ingredients on conventional rubber milling rolls which had been heated to about 80–85° C. In those examples in which a material was irradiated, the material, in sheet form, was irradiated by a beam of high energy electrons produced by the high voltage accelerating apparatus of the aforementioned Westendorp patent. The peak voltage of the electrons was 800,000 electron volts. The percent volume increase referred to in the examples was determined by soaking the material in question in a mixture of 30 parts by volume of toluene and 70 parts by volume of isooctane and allowing the mixture to sit for 72 hours at room temperature. The percent volume increase is equal to 100 times the final volume less the initial volume divided by the initial volume. All parts are by weight.

*Example 1*

Twenty-five parts of silicone gum and 25 parts of poly-1,1-dihydroperfluorobutyl acrylate were blended together on a rubber mill with 14 parts of precipitated silica (Hi-Sil X–303). This blend was then pressed into a 38 mil sheet which was irradiated with high energy electrons to a dose of $12 \times 10^6$ r. This resulted in a cured covulcanizate having a tensile strength of 950 p.s.i., an elongation of 170 percent, and a volume increase of 120 percent.

*Example 2*

Twenty-five parts of the silicone gum described above, 25 parts of poly-1,1-dihydroperfluorobutyl acrylate and 14 parts of precipitated silica were blended on a rubber mill with 1.1 parts of benzoyl peroxide. This blend was formed into a 38 mil sheet and heated at 120° C. for 20 minutes to effect vulcanization. The resulting covulcanizate had a tensile strength of 800 p.s.i., an elongation of 250 percent and a volume increase of 130 percent. In order to compare this covulcanizate with a cured silicone rubber, the formulation described above was altered by eliminating the poly-1,1-dihydroperfluorobutyl acrylate and by cutting the amount of filler and benzoyl peroxide in half. When this resulting sheet was cured, it was found to have a volume increase of 270 percent, over twice the volume increase of the blend of the silicone and the acrylate.

*Example 3*

This example illustrates the preparation of a number of blends and covulcanizates within the scope of the present invention from the dimethyl silicone gum described above, a gum consisting of repeating 1,1-dihydroperfluorobutyl acrylate units and a silica aerogel filler (Santocel CS). After blending these materials in the desired proportions on rubber milling rolls at about 80° C., 20 mil sheets of the resulting blends were pressed out and irradiated to various doses at a dose rate of $2.98 \times 10^5$ r. per second employing the apparatus described in the aforementioned Westendorp patent. Tensile strengths, percent elongations and the percent volume increase were determined for each sample. In addition, the theoretical percent volume increase was determined for each sample by the following formula Vol. percent increase $= 100\ (V_S S_S + V_A S_A - 1)$ where $V_S$ is the volume fraction of silicone (density equals 0.98), $V_A$ is the volume fraction of the acrylate gum (density equals 1.5), $S_S$ is the swollen volume starting with 1 cc. of filled silicone, and $S_A$ is the swollen volume starting with 1 cc. of the filled acrylate gum. The values of $S_S$ and $S_A$ were determined by preparing a filled silicone gum and a filled acrylate gum and irradiating each of these two gums to the same doses as for the blends. The table below lists the compositions of ingredients in each of the blends as well as the composition of the filled silicone and filled acrylate polymer. The table also indicates the radiation dose for each sample, the tensile strength, the percent elongation, the observed percent volume increase, and the calculated percent volume increase.

| Sample | Composition, parts | Radiation dose, mega roentgens | Tensile strength, p.s.i. | Elongation, percent | Percent vol. inc. obser. | Percent vol. inc. cal. |
|---|---|---|---|---|---|---|
| A | 30.3 Silicone, 10.0 Acrylate, 10.2 Filler | 6 | 890 | 390 | 200 | 214 |
|   |   | 12 | 710 | 170 | 170 | 176 |
| B | 20.3 Silicone, 20.9 Acrylate, 15.9 Filler | 6 | 910 | 390 | 120 | 161 |
|   |   | 12 | 900 | 220 | 100 | 134 |
|   |   | 18 | 910 | 150 | 90 | 98 |
| C | 10.4 Silicone, 30.0 Acrylate, 12.5 Filler | 6 | 880 | 420 | 60 | 100 |
|   |   | 12 | 840 | 270 | 40 | 81 |
|   |   | 18 | 840 | 140 | 50 | 61 |
| D | 40.3 Silicone, 10.0 Filler | 6 | 650 | 440 | 260 | |
|   |   | 12 | | | 210 | |
|   |   | 18 | 617 | 181 | 160 | |
| E | 40.0 Acrylate, 13.0 Filler | 6 | | | 9 | |
|   |   | 12 | | | 8 | |
|   |   | 18 | | | 7 | |

The sample C described in the table above represents the preferred composition of the present invention. From the data in the table with regard to sample C, it is seen that this blend has a high tensile strength, a satisfactory percentage elongation and an excellent percentage volume increase which represents the high resistance to hydrocarbon solvents of this material. In addition, the data for sample C show that the solvent resistance of blend C is far better than the solvent resistance which would be expected if the solvent resistance of the blend were the mere result of adding the solvent resistance of the silicone gum to the solvent resistance of the acrylate gum. It is also seen from the data of the table above that samples A and B possess good tensile strengths and elongations and reasonable good percent volume increases, which are far superior to the percentage volume increase observed from a filled silicone rubber containing no acrylate polymer. In addition, it is seen that the solvent resistance of blends A and B (particularly blend B) are greater than the additive value expected from the solvent resistance of the silicone gum alone or the acrylate gum alone.

In addition to the properties described above, the covulcanizates of Example 3 were also resistant to oxidative degradation and were resistant to polar solvents. They also exhibited flexibility at low temperatures superior to the low temperature flexibility of the fluorinated acrylate ester gums alone.

The covulcanizates of the present invention may be employed in any of the applications which are conventional to natural rubber and other types of synthetic rubber. These covulcanizates are particularly useful for applications in environments where oxidation resistance, thermal stability, high tensile strength, low temperature flexibility and resistance to both polar and non-polar solvents are desired. In particular the covulcanizates of the present invention are useful as gasket material for aircraft applications where extremes of temperatures are encountered and where the gasket material must come into contact with hydrocarbon solvents such as aviation gasoline and lubricating oils. In addition, the covulcanizates of the present invention may be bonded to many types of metal surfaces, such as copper surfaces by effecting vulcanization of the blend while in contact with the metal surface. The blends of the present invention may also be extruded in the form of sheets, rods and tubes and subsequently covulcanized by chemical means or by ionizing irradiation to form covulcanizates of the desired shape.

What I claim and desire to secure by Letters Patent of the United States is:

1. A covulcanizable composition of matter comprising a blend of a fluorinated polyacrylate ester having the recurring structural unit

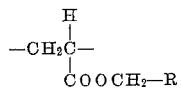

where R is a member selected from the class consisting of perfluoroalkyl radicals, perfluoroalkoxyperfluoroalkyl radicals, and ω-hydroperfluoroalkoxyperfluoroalkyl radicals and an organopolysiloxane gum having the average structural formula

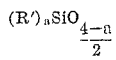

where R' represents members selected from the class consisting of monovalent hydrocarbon radicals and monovalent halogenated hydrocarbon radicals, at least 40 mole percent of said R' radicals being methyl radicals, and $a$ has a value of from 1.98 to 2.01, inclusive, the aforesaid fluorinated polyacrylate ester comprising from 10 to 90 percent, by weight, of the total weight of the latter and the organopolysiloxane gum.

2. The cured product of claim 1.

3. A covulcanizable composition of matter comprising (A) a blend of a fluorinated polyacrylate ester having the recurring structural unit

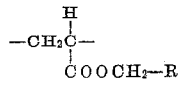

where R is selected from the class consisting of perfluoroalkyl radicals, perfluoroalkoxyperfluoroalkyl radicals and ω-hydroperfluoroalkoxyperfluoroalkyl radicals and (B) an organopolysiloxane gum having the average structural formula

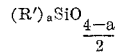

where R' represents members selected from the class consisting of monovalent hydrocarbon radicals and monovalent halogenated hydrocarbon radicals, at least 40 mol percent of said R' radicals being methyl radicals, and $a$ has a value from 1.98 to 2.01, inclusive, and (C) a filler, the aforesaid fluorinated polyacrylate ester comprising from 10 to 90 percent, by weight, of the total weight of the latter and the organopolysiloxane gum.

4. The cured product of claim 3.

5. A covulcanizable composition of matter comprising a blend of a fluorinated polyacrylate ester having the recurring structural unit

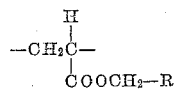

where R represents a member selected from the class consisting of perfluoroalkyl radicals, perfluoroalkoxyperfluoroalkyl radicals, and ω-hydroperfluoroalkoxyperfluoroalkyl radicals and a dimethylpolysiloxane gum, the aforesaid fluorinated polyacrylate ester comprising from 10 to 90 percent, by weight, of the total weight of the latter and the dimethylpolysiloxane gum.

6. The cured product of claim 5.

7. A covulcanizable composition of matter comprising a blend of poly-1,1-dihydroperfluorobutyl acrylate and an organopolysiloxane gum having the average structural formula

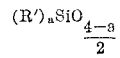

where R' represents members selected from the class consisting of monovalent hydrocarbon radicals and monovalent halogenated hydrocarbon radicals, at least 40 mol percent of said R' radicals being methyl radicals, and $a$ has a value from 1.98 to 2.01, inclusive, the aforesaid acrylate comprising from 10 to 90 percent, by weight, of the total weight of the latter and the organopolysiloxane gum.

8. The cured product of claim 7.

9. A covulcanizable composition of matter comprising a blend of poly-1,1-dihydroperfluorobutyl acrylate and a dimethylpolysiloxane gum, the aforesaid acrylate comprising, by weight, from 10 to 90 percent of the total weight of the latter and the dimethylpolysiloxane gum.

10. The cured product of claim 9.

11. A covulcanizable composition of matter comprising (A) a blend of poly-1,1-dihydroperfluorobutyl acrylate, (B) a dimethylpolysiloxane gum, and (C) a silica aerogel filler, the aforesaid acrylate comprising, by weight, from 10 to 90 percent of the total weight of the latter and the dimethylpolysiloxane gum.

12. The cured product of claim 11.

References Cited in the file of this patent

UNITED STATES PATENTS

| | | |
|---|---|---|
| 2,258,218 | Rochow | Oct. 7, 1941 |
| 2,350,330 | Remy | June 6, 1944 |
| 2,710,290 | Safford | June 7, 1955 |
| 2,763,609 | Lewis | Sept. 18, 1956 |
| 2,811,501 | Stedry | Oct. 29, 1957 |
| 2,867,599 | Hurd et al. | Jan. 6, 1959 |
| 2,884,388 | Hedlund | Apr. 28, 1959 |
| 2,967,168 | Hurd | Jan. 3, 1961 |

OTHER REFERENCES

Bovey: "Journal of Polymer Science," vol. 15, pages 515 to 574 (1955).